United States Patent [19]

de Haan et al.

[11] 4,375,088

[45] Feb. 22, 1983

[54] OPTICALLY READABLE RECORD CARRIER WITH TRACK VARIATIONS WHICH PROVIDE CLOCK AND TRACKING SIGNALS AND APPARATUS FOR RECORDING AND/OR REPRODUCING DATA FROM SUCH A RECORD CARRIER

[75] Inventors: Maarten R. de Haan; Klaas Compaan; Leopold H. Hissel, all of Eindhaven, Netherlands

[73] Assignee: U.S. Philips Corporation, New York, N.Y.

[21] Appl. No.: 139,924

[22] Filed: Apr. 14, 1980

[30] Foreign Application Priority Data

Jan. 9, 1980 [NL] Netherlands .................... 8000122

[51] Int. Cl.³ .................................................. G11B 7/00
[52] U.S. Cl. ...................................... 365/234; 369/44; 369/48; 369/111
[58] Field of Search .......................... 365/234, 215; 369/44–48, 109, 110, 111, 275, 43; 360/77; 358/128.5, 128.6

[56] References Cited

U.S. PATENT DOCUMENTS

| | | | |
|---|---|---|---|
| 3,962,720 | 6/1976 | Braat | 369/47 X |
| 3,963,862 | 6/1976 | Bouwhuis | 369/46 X |
| 4,025,784 | 5/1977 | Lehureau et al. | 369/46 X |
| 4,059,841 | 11/1977 | Bricot et al. | 369/46 X |
| 4,065,786 | 12/1977 | Stewart | 369/46 |
| 4,190,859 | 2/1980 | Kinjo | 358/128.5 |
| 4,223,187 | 9/1980 | Yonezawa et al. | 369/111 X |
| 4,223,347 | 9/1980 | Bouwhuis et al. | 358/128.5 |
| 4,238,843 | 12/1980 | Carasso et al. | 365/234 |
| 4,296,491 | 10/1981 | Jerome | 358/128.5 |

Primary Examiner—Bernard Konick
Assistant Examiner—Donald McElheny, Jr.
Attorney, Agent, or Firm—Thomas A. Briody; Robert T. Mayer; Algy Tamoshunas

[57] ABSTRACT

Disclosed is a record carrier for storage of digital data which is provided with a first periodic track variation having a period corresponding to a frequency at which the power spectrum of the digital signals is at a zero level. The first track variation produces a corresponding modulation of the radiation when scanned by a beam so that a clock signal can be derived from the detected radiation for synchronizing readout or recording of the data. The record carrier is further provided with a second periodic track variation in a direction transverse to the track direction having a period of the same order of magnitude, and preferably equal to the period of the first periodic track modulation. The second track variation produces a corresponding modulation of the beam which is detected and is used to generate to a tracking signal, the clock signal being used as phase reference signal for demodulation of the tracking signal. If the periods of the two track variations are equal, low-pass filtering automatically yields the tracking signal.

38 Claims, 26 Drawing Figures

OPTICALLY READABLE RECORD CARRIER WITH TRACK VARIATIONS WHICH PROVIDE CLOCK AND TRACKING SIGNALS AND APPARATUS FOR RECORDING AND/OR REPRODUCING DATA FROM SUCH A RECORD CARRIER

BACKGROUND OF THE INVENTION

The invention relates to a record carrier comprising a disc-shaped substrate with a radiation-sensitive information layer provided with information areas arranged in accordance with a spiral or concentric track pattern. Such a record carrier is intended for recording and/or reproduction of digitally coded information of fixed bit frequency by a beam of radiation.

The invention, furthermore, relates to an apparatus for manufacturing such a record carrier, to an apparatus for recording information thereon, and to an apparatus for reproducing information recorded in the information areas of such a record carrier.

A record carrier of the type mentioned in the preamble as well as apparatus for recording and/or reading information on and/or from such a record carrier is known from Netherlands Patent Application No. 7,802,859, which has been laid open to public inspection and corresponds to pending U.S. application Ser. No. 131,316, filed Apr. 14, 1980. On this record carrier the information areas alternate with synchronization areas in the track direction. The synchronization areas contain the address of an adjacent information segment in which data is to be recorded. In order to obtain a radial tracking signal, i.e. a signal for keeping the laser beam centered on the track, in said application it is is proposed to give the track a radial variation or undulation of a frequency which is low relative to the bit frequency. The radial track variations produce a corresponding modulation in the reflected beam so that a signal indicative of the deviation of the laser beam from the center of the track to be followed can be derived from the detected radiation. One drawback of this construction is that the phase relationship of the detected modulation and the radial track variations must be known in order to determine the direction of the tracking error so that a reference signal is required.

SUMMARY OF THE INVENTION

It is an object of the invention to provide a record carrier of the type mentioned in the preamble without the above drawback. To this end the record carrier in accordance with the invention is characterized in that it has an optically detectable first periodic track variation which produces a corresponding modulation in the beam of a frequency equal to the bit frequency or an integral multiple thereof. Upon detection, this modulation is used for generating a clock signal of the bit frequency during recording and/or reproduction of the digital data. In addition, superimposed on the first periodic track variation, there is a second periodic radial track variation. The period of the second periodic track variation is at least of the same order of magnitude as the period of the first periodic track variation. The modulation of the beam produced by the second, radial track variations is used to generate a radial tracking signal during recording and/or readout of the digital data.

The invention is based on the recognition that in the case of digital data recording it is possible to provide the record carrier in advance with two types of periodic variations so as to modulate the radiation with a first frequency which is synchronous with the bit frequency of the data signal to be recorded and a second frequency of the same order of magnitude. Both during information reading and recording, these frequencies can be detected without any significant interference. The signal corresponding to the first periodic variation pattern can be used not only to derive a clock signal—which constitutes the subject of co-pending U.S. Patent Application Ser. No. 134,392, filed Mar. 26, 1980—but also to derive a phase reference signal for the generation of the radial tracking signal. The frequencies of the signals which correspond to the two periodic track variations together yield a low frequency mixing signal obtained electronically without being affected by low-frequency spurious signals. The servo tracks employed for radial tracking produce an amplitude-modulated signal in the detected signal with the clock signal corresponding to the first periodic track variation functioning as a carrier wave.

A first preferred embodiment of a record carrier in accordance with the invention is further characterized in that, the period of the first periodic track variation at a specific tangential speed of the record carrier corresponds to a first signal frequency and the period of the second periodic track modulation at said specific tangential speed corresponds to a second signal frequency. The frequency difference between the first and the second signal frequency is constant and comparatively low relative to said first signal frequency.

When this record carrier is used, an amplitude-modulated signal having a frequency equal to said difference signal is obtained during read-out. The signals corresponding to the two periodic track modulations can be filtered out and, for example, by means of a synchronous mixing stage, the difference frequency can be determined with which said difference signal can be synchronously demodulated directly yielding a tracking signal.

A second preferred embodiment of a record carrier in accordance with the invention may further be characterized in that the period of the first periodic track variation is equal to the period of the second periodic track variation and that the two track variations have a fixed relationship with each other.

When this record carrier is used, the low-frequency tracking signal appears directly in the detected signal because the product of the two modulations formed during read-out in fact demodulates itself. In the case of a constant phase relationship, this product contains a constant term so that the tracking-dependent modulation can be filtered out of the detected signal as a low-frequency signal directly without synchronous demodulation.

In this preferred embodiment the phase difference is preferably equal to a quarter of the period of the track variations.

In the simplest form, this preferred embodiment may further be characterized in that the first and second periodic track variations are both formed by pits in the record-carrier. At least in the information areas, the pits are spaced at equal distances from each other, are spirally or concentrically aligned and have a geometry which extends substantially in a direction which makes an angle unequal to zero both with the local tangential direction and the local radial direction.

An apparatus for manufacturing a record carrier in accordance with the invention uses a laser beam to inscribe the track pattern prior to recording of data. The apparatus includes a first modulation device for modulating the laser beam in order to obtain said first periodic track variation, and a second modulation device for modulating the target spot of said laser beam at the record-carrier surface in a radial direction in order to obtain said second period track variation.

An apparatus for recording information on a record carrier in accordance with the invention is provided with a laser and an optical system for directing the laser beam to the information areas. A recording circuit is used for modulating the laser beam intensity depending on the digital signal to be recorded. The radiation which is modulated and is reflected or transmitted by the record carrier is detected by a detector. The period of the first periodic track variation on said record carrier at a specific tangential speed produces a modulation component corresponding to a first signal frequency and the period of the second periodic track variation at said specific tangential speed produces a second modulation component corresponding to a second signal frequency. The frequency difference between the first and the second signal frequency is constant and comparatively low relative to the first signal frequency. The apparatus includes a first band-pass filter for extracting signals of a first frequency in order to obtain a clock signal which is applied to the recording circuit for synchronizing the recording of the digital information. The apparatus further includes a second band-pass filter tuned to the second frequency and a first synchronous detection circuit for mixing the filtered signals of the first and the second frequency in order to obtain a signal having a frequency equal to the difference between the first and the second frequencies. A third band-pass filter tuned to said frequency difference is used for filtering the signal detected by the detector, and a second synchronous detector circuit is used for mixing the signal extracted by the third band-pass filter with the output signal of the first synchronous detector dircuit in order to obtain a radial tracking signal.

Said apparatus may further be characterized in that the detector is divided into sectors along an tangential line and along a radial line. The difference between the signals detected by the detector halves divided by the radial line is applied to the first band-pass filter. Similarly, the difference between the two signals detected by the detector halves divided by the tangential line is applied to the second band-pass filter, and the sum of the signals detected by all four sectors is applied to the third band-pass filter.

For the case where the period of the first periodic track variation on said record carrier is equal to the period of the second periodic track variation and the two track variations have a fixed phase relationship with each other, the data recording apparatus may be provided with a band-pass filter tuned to a frequency which at a specific tangential speed of the record carrier corresponds to the period of the first periodic track variation. The filter is coupled to the detector and supplies a clock signal which is applied to the recording circuit for synchronizing the recording of said digital information. A low-pass filter is used for filtering the signal supplied by the detector in order to obtain a radial tracking signal.

This apparatus may further be characterized in that the detector is divided into two halves along a radial line and that the difference between the signals detected by said two halves is applied to the band-pass filter.

An apparatus for reproducing information recorded in the information areas of a record carrier in accordance with the invention employs a laser beam to scan said information areas, an optical system and a detector for detecting the modulated radiation which is reflected or transmitted by the record. A read circuit extracts the recorded data signal from the detected radiation. As stated earlier, the detected signal contains modulation components of a first frequency corresponding to the period of the first periodic track variation at a specific tangential speed of the record and of a second frequency corresponding to the period of the second periodic track variation at said specific tangential speed. The frequency difference between the first and the second signal frequencies is constant and comparatively low relative to the first signal frequency. The apparatus includes a first band-pass filter for extracting signals of the first frequency to obtain a clock signal which is applied to the read circuit for the synchronization of the read-out of the digital information. The apparatus further includes a second band-pass filter tuned to the second frequency and a first synchronous detection circuit for mixing the filtered signals of the first and the second frequency in order to obtain a signal of a frequency equal to the difference between the first and the second frequencies. A third band-pass filter tuned to said frequency difference is used to filter the signal detected by the detector. A second synchronous detector circuit mixes the signal filtered out by the third band-pass filter with the output signal of the first synchronous detector circuit in order to obtain a radial tracking signal.

This apparatus may further be characterized in that the detector is divided into sectors along a tangential line and along a radial line. The difference between the signals detected by the two detector halves divided by the radial line is then applied to the first band-pass filter. The difference between the signals detected by the two detector halves divided by the tangential line is applied to the second band-pass filter, and the sum of the signals detected by all four sectors is applied to the third band-pass filter and to the read circuit.

For the case wherein the period of the first periodic track variation on said record carrier is equal to the period of the second periodic track variation with the two track modulations being in a fixed phase relationship with each other, the playback apparatus includes a band-pass filter tuned to a frequency corresponding to the period of the first periodic track variation at a specific tangential speed of the record. The filter is coupled to the detector so as to supply a clock signal which is applied to the read circuit for synchronization of the read-out of said digital information. A low-pass filter is used for filtering the signal supplied by the detector in order to obtain a radial tracking signal.

This apparatus may further be characterized in that the detector is divided into two halves along a radial line and that the difference between the signals detected by the two halves is applied to the band-pass filter.

BRIEF DESCRIPTION OF THE DRAWINGS

The invention will be described in more detail with reference to the drawing, in which:

FIGS. 3a through 3d schematically show a cross-sectional view in the longitudinal direction through a part of the track 4, FIG. 3a showing such a cross-section for a blank prepared disc in accordance with a known technology, FIG. 3b showing said cross-section of FIG. 3a after information has been recorded in the information area 9, FIG. 3c showing such a cross-section for a blank prepared disc with the first periodic modulation, FIG. 3d showing the cross-section of FIG. 3c after digital information has been inscribed. FIG. 3e schematically represents the signal obtained when reading the part of the track 4 shown in cross-section in FIG. 3d, and FIG. 3f schematically represents a plan view of a part of the track 4 after digital information has been recorded in a manner other than illustrated in FIGS. 3b and 3d, FIGS. 5a-c are diagrammatic representation of said modulations, FIG. 6 in FIG. 6a schematically represents an apparatus for manufacturing a record carrier in accordance with the invention, FIG. 6b schematically illustrates the principle of an apparatus for recording information in the record carrier in accordance with the invention, and FIG. 6c schematically illustrates the principle of an apparatus for reading an inscribed record carrier in accordance with the invention, FIGS. 7a-7e a number of examples of a periodic track modulation in accordance with the invention, FIG. 8a illustrates the principle of a read section of an apparatus for reading and/or recording a digital signal from or on a record carrier in accordance with the invention with a radial track modulation of substantially the same period as the first periodic track modulation, FIG. 8b showing the frequency spectrum of the signal detected by the detector 27.

DESCRIPTION OF THE PREFERRED EMBODIMENTS

Figure 1A:
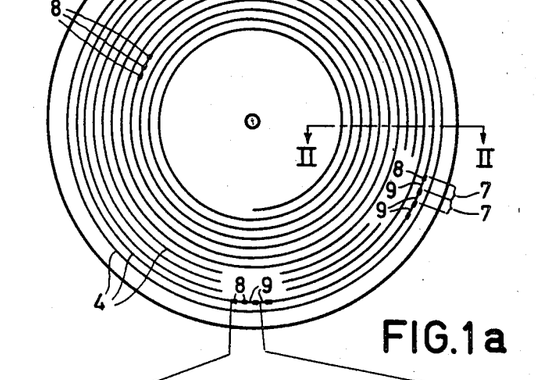
FIG. 1a–1c embodiments of a record carrier to which the inventive principle may be applied, FIG. 1a being a plan view of the record carrier, FIG. 1b showing a part of a track 4 of said record carrier on an enlarged scale, and FIG. 1c showing a synchronization area of said part on an enlarged scale.

In the embodiment shown in FIG. 1 the record carrier body 1 is provided with a spiral track 4. This track 4 is divided into a multitude of sectors 7, for example 128 per revolution. Each sector 7 comprises an information area or section 9 for storing digitally coded data, and a synchronization area or section 8.

Figure 2:
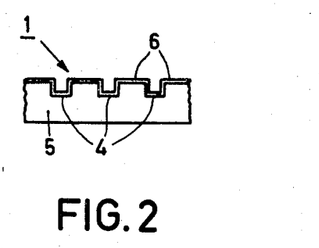
FIG. 2 shows a small part of the cross-section taken on the line II-II' in FIG. 1a, FIGS. 3a-3f show the record carriers during various data recording stages.

In order to ensure that the data is recorded in an accurately defined path, the track 4 is employed as servo track. For this purpose the information areas 9 of the sectors 7 have an amplitude structure, as is shown in FIG. 2. FIG. 2 shows a small part of the cross-section taken on the line II-II' in FIG. 1a and thus shows a number of adjacent track portions, specifically information sections, of the servo track 4. The direction of the servo tracks 4 is thus perpendicular to the plane of drawing. The servo tracks 4, in particular the information areas 9, thus take the form of grooves in the substrate 5. In this way it is possible to make a radiation beam, which is directed at the record carrier in order to record digital information, accurately coincide with said servo track 4, in other words to control the position of the radiation beam in a radial direction via a servo system which employs light reflected by the carrier.

For recording of digital information, the record carrier body is provided with a layer of a material 6 which, when exposed to suitable radiation, undergoes an optically detectable change. In principle only the information areas 9 of the sectors need be provided with such a layer. However, for reasons of manufacturing technology it is simpler to provide the entire record carrier surface with such a layer. This layer 6 may, for example, comprise a thin layer of a metal such as tellurium. This metal layer can be melted locally by laser radiation of sufficiently high intensity, so that locally this information layer 6 is given a different reflection coefficient. As a result, the reflected radiation beam is amplitude-modulated in accordance with the recorded information when an information track thus inscribed is scanned by a read beam.

Alternatively, the layer 6 may take the form of a double layer of materials, for example aluminium on iron, which react chemically to incident radiation. At the location where a high-power radiation beam is incident on the disc, $FeAl_6$ is formed, which is a poor reflector. A similar effect is obtained with a double layer of bismuth on tellurium, in which case $Bi_2Te_3$ is formed upon exposure of the beam. It is also possible to employ a single layer of tellurium.

As stated earlier, the servo track, which is in the form of a groove in the substrate 5, serves to maintain the write radiation spot accurately centered on the servo track, in particular when an information area is being scanned. The data modulating the write beam is thus recorded in the information area coinciding with the servo track.

Figure 1B:
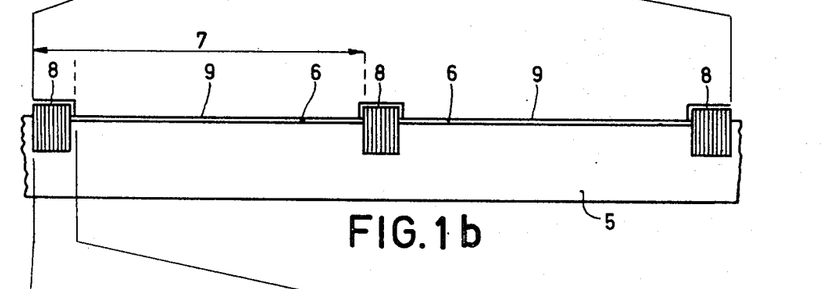
Figure 1C:
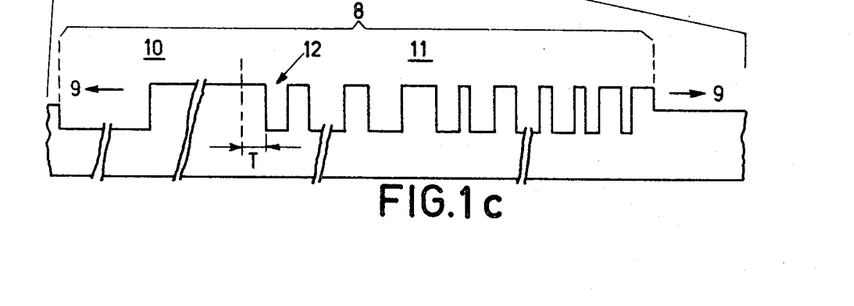

As is apparent from the foregoing, the record blanks, in which the information areas do not yet contain information, have a groove structure in said information areas within the sectors. Moreover, within each sector such a record blank has a synchronization area 8 in the form of an optically detectable relief structure. FIG. 1b on an enlarged scale shows a part of a track 4, from which the sequence of a number of information areas 9 and synchronization areas 8 is apparent. In this case the synchronization areas 8 comprise a relief structure constituted by a sequence of recesses alternating with intermediate areas. The depth of the recesses in the structure of the synchronization area is greater than the depth of the servo track in the information area 9. This depth and shape of the recesses is selected in accordance with general optical rules such that an optimum read-out of the information represented by the structure is obtained. In the case of a read system in which the radiation beam reflected by the record carrier is detected by a single photo-detector, $\frac{1}{4}\lambda$ may be selected as depth for the recesses, $\lambda$ being the wavelength of the radiation beam used. If the depth of the servo track in the information area 9 is made $\frac{1}{8}\lambda$ or less, this servo track will have very little affect on the amount of light detected by the detector.

In order to further illustrate the structure of the synchronization area, FIG. 1c again shows such a synchronization area on an enlarged scale, the information layer 6 being omitted for the sake of simplicity. Such a synchronization area 8 comprises two portions, namely an indication portion 10 and an address portion 11. The address portion 11 contains all the information required for controlling the recording process. When recording digital information, this information is converted into a so-called word-organized bit series. The address portion contains information about the word organization, so that during recording the location of the bit words is defined and during reading the bit words are suitably decoded. Furthermore, the address portion 11 also contains information about the relevant track number. This information takes the form of a relief structure in accordance with a digital modulation technique suitable for the recording medium. Since, in addition to the servo track in the form of a groove in the information portions 9, the synchronization area contains all the information required for the positioning of the information in the form of a bit-word-organized bit series in information segment 9, the requirements imposed on the write and read apparatus employed by the user may be less stringent. Furthermore since this fully prerecorded information is formed in the record carrier as a relief structure, the record blank is particularly suitable for mass-production, enabling the customary pressing techniques to be used.

FIGS. 3a through 3d schematically represent a part of such a servo track 4 in cross-section in the longitudinal direction of said servo tracks 4 with a part of the sychronization area 8 and a part of the information area 9. FIG. 3a shows such a cross-section of a blank prepared disc using a known technique. FIG. 3b shows such a cross-section after digital information 14 has been recorded in the information area 9. FIG. 3c shows such a cross-section of a blank prepared disc provided with clock information in the form of a first periodic track modulation and FIG. 3d representing the cross-section of FIG. 3c after data 14 has been recorded in the information area 9. FIG. 3e schematically represents the signal obtained when reading the part of the track 4 shown in cross-section in FIG. 3d. FIG. 3f schematically shows a plan view of a part of the track 4 after information has been recorded in a manner other than represented in FIGS. 3b and 3d.

The prepared disc is provided with a servo track 4, formed in a substrate 5, for example by means of a laser beam. By modulating the intensity of the laser beam it is then possible to form a relief structure of "pits" 13 containing information in the synchronization area 8. Subsequently, the entire disc, including for the sake of simplicity, the portion of the record carrier 1 outside the grooves 4 may then be coated with the reflecting information layer 6. In the record carrier thus prepared, information can be recorded in the information area 9 by forming holes 14 in the reflecting information layer 6, for example by means of a laser beam. Such an inscribed record carrier is shown in FIG. 3b. When information is written, i.e. when the holes 14 are formed, and when the information is read, for example by means of a laser beam, it is of importance that this information writing or reading process is synchronized with the aid of a clock signal, about which the synchronization areas 8 may contain information. In order to ensure that during writing and reading a suitable synchronous clock signal is continuously available, i.e. also during writing or reading in the information areas 9, the servo groove 4 is provided with a first periodic structure which produces a modulation of the light reflected by the information carrier when the servo track 4 is scanned during reading or writing.

Figure 4:
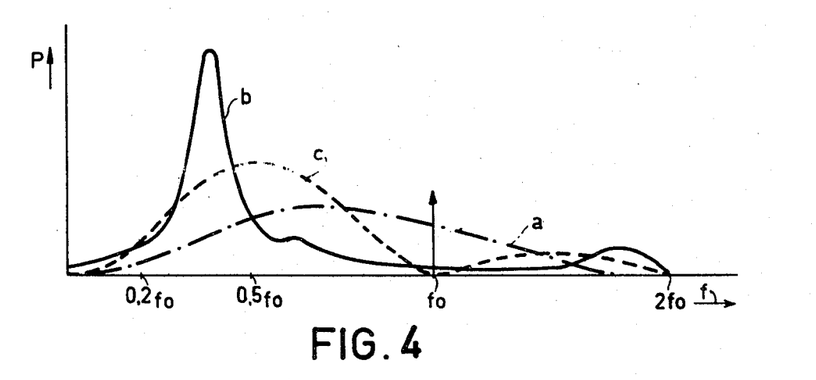
FIG. 4 shows the random power spectra of three digital-information-signal modulations.

However, this structure should be such that it does not disturb the read-out of information. That this is possible is explained with reference to FIGS. 4 and 5, FIG. 4 representing the random power spectra of three possible binary-information-signal modulations and FIG. 5 being a diagrammatic representation of said modulations.

Figure 5:
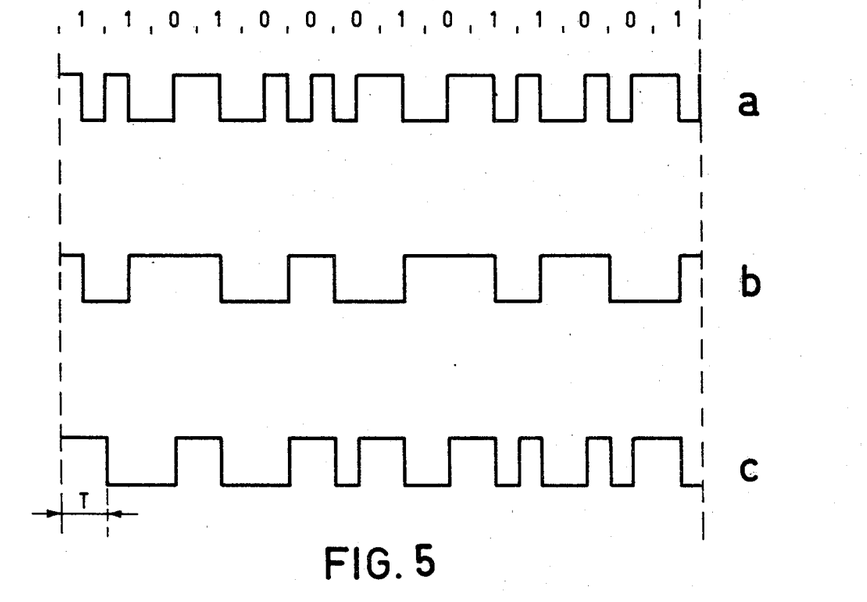

The signal a in FIG. 5 designates a modulation known by the name of "biphase" modulation. In this scheme the applied digital signal is converted into a binary signal such that a logic "one" of the applied digital signal is positive during the time interval $T/2$ and negative during the next time interval $T/2$, $T$ being the bit length of the applied digital signal. A logic "zero" yields exactly the opposite binary signal, i.e. negative for the time interval $T/2$ and positive for the next time interval $T/2$. This modulation technique yields a binary signal which has a power spectrum represented by curve a in FIG. 4. The frequency fo then corresponds to $(1/T)$.

Signal b in FIG. 5 represents the modulation known by the name of "Miller" modulation. The binary signal generated by means of this modulation has a transition halfway a logic "one" of the applied digital signal and at the transition of two consecutive logic "zeros". The frequency spectrum of the binary signal obtained by means of this modulation technique is shown by curve b in FIG. 4.

Finally, signal c in FIG. 5 represents a modulation known by the name of "quadphase" modulation. In this scheme the applied bit series of the digital signal are first divided into consecutive groups of two bits. From each two-bit group having a duration 2T, a binary signal is derived, which in a first time interval T has the same variation as the original two bits and in the next time interval T an inverse variation. The bit combinations 11, 00, 01 and 10 which are possible are thus converted into the bit combinations 1100, 0011, 0110 and 1001, respectively. The binary signal obtained by means of this modulation technique has a frequency spectrum represented by curve c in FIG. 4.

It is evident from FIG. 4 that these modulation techniques have a common property in that the resulting binary signal exhibits no strong frequency components at comparatively low frequencies, for example frequencies below 0.2 fo. This is very useful when an optical record carrier is used with the associated write and read systems. As stated previously, such systems employ both a servo control to keep the scanning spot accurately focussed on the record carrier and a servo control which controls the radial position of the scanning spot and ensures that said scanning spot accurately coincides with the information track. Since the control signals required for these servo controls are derived from the reflected radiation beam which is also modulated by the relief structure of the synchronization area, it is essential that the frequency spectrum of the binary signal stored in the address portion does not contain any strong frequency components within the frequency band intended for the control signals. FIG. 4 thus shows that the frequency band below approximately 0.2 fo is suitable for such control signals. Furthermore, it is apparent from FIG. 4 that at the frequency 2 fo and for the case of modulation method c, as well as some modulation methods not described, the spectrum also has zero points at the frequency fo. Thus, it is possible to provide the record carrier with a clock structure of the frequency 2 fo without interference with the information signal. Zero points at the frequency 2 fo also occur in the case of other modulation methods. When quadphase modulation (modulation c) is used and also in the case of some other modulation methods, the frequency fo is highly suitable for this purpose, said frequency corresponding to the bit frequency 1/T, so that this quadphase modulation becomes very attractive. Also in the case of modulation method b a structure with the frequency fo may be used in some cases because the components of the spectrum of modulation b are comparatively small at said frequency. Furthermore, it is theoretically possible to give the structure a modulation corresponding to a frequency higher than 2 fo, but in practice this is generally not feasible. Indeed, in view of a maximum information density, the dimensions of the pits 13 and 14, which at a specific speed of rotation of the disc 1 at least correspond to a bit length of ½T, are selected nearest the resolution of the write/read system used, so that the surface structure corresponding to frequencies higher than 2 fo will hardly be detectable.

FIG. 3c shows a cross-section of a record carrier corresponding to the cross-section of FIG. 3a, whose surface, at least at the location of the track 4, has been provided with a relief structure having a height d. A possibility of realizing this structure is to modulate the laser by means of which the synchronization area 8 and the groove 4 of the information area 9 is formed. In the present example this only needs to be done in the synchronization area 8 between the pits 13 by limiting the intensity of the laser beam. However, in principle it is also possible to provide the bottoms of the pits with a relief structure.

As is shown in FIG. 3d the disc in accordance with the invention can also be provided with information by forming holes 14 in the reflecting layer 6 covering the relief structure.

FIG. 3e shows an example of a signal obtained when reading a relief structure in accordance with FIG. 3d. This signal exhibits minima at the location of the pits 13 or the holes 14 and an amplitude modulation corresponding to the first modulation structure (d in FIG. 3c) with the frequency fo at the maxima. The modulation structure of the bottoms of the holes 14 contributes to the signal, because it hardly reflects very little light owing to the removal of the reflecting layer 6. In this respect it is to be noted that it is, for example, also possible to provide a non-reflecting layer 6 on a reflecting substrate 5, which layer is locally removed. As a result of this the modulation of the frequency fo will be read satisfactorily at these very locations.

In FIGS. 3a–3d the pits 13 or the holes 14 are shown as continuous holes or pits, i.e. in the case of consecutive bits, the pits form an elongate slot having a length corresponding to the number of consecutive bits. However, it is also possible to provide a separate pit or hole for each bit. FIG. 3f illustrates this and shows a track 4 in which the clock modulation structure is represented by different types or hatching. In the synchronization area 8 the pits 13 may then, for example, be formed in the centre of the maxima or minima of the structure and are also coated with a reflecting layer 6, which is symbolized by the hatching through said pits 13. In the information portion 9 the information holes 14 may be formed in the reflecting layer 6 at the maxima and minima of the clock information structure. Alternatively—as is represented by the information area 9 FIG. 3f-holes 14' may be formed at the zero points of the information structure. In this respect the location of the pits 13 or holes 14 is not essential, provided that the phase relationship with the clock information structure is fixed and known. Neither is the shape of the information structure of great significance. Instead of the rectangular shape shown in FIG. 3 it may well have a sinusoidal shape, which is readily possible in the case of manufacture by means of a modulated laser beam. It is of importance only that said clock synchronization structure exhibits a frequency component which can readily be detected at the frequency fo or 2 fo and which exhibits no strong components within the spectrum of the synchronization or data signal recorded or to be recorded. This is generally the case when the clock information structure d has a fundamental frequency fo or 2 fo with higher order harmonics only; the next harmonic is then 2 fo or 4 fo, which, as shown in FIG. 4, falls beyond the part of the information spectrum which is of interest.

Figure 3:
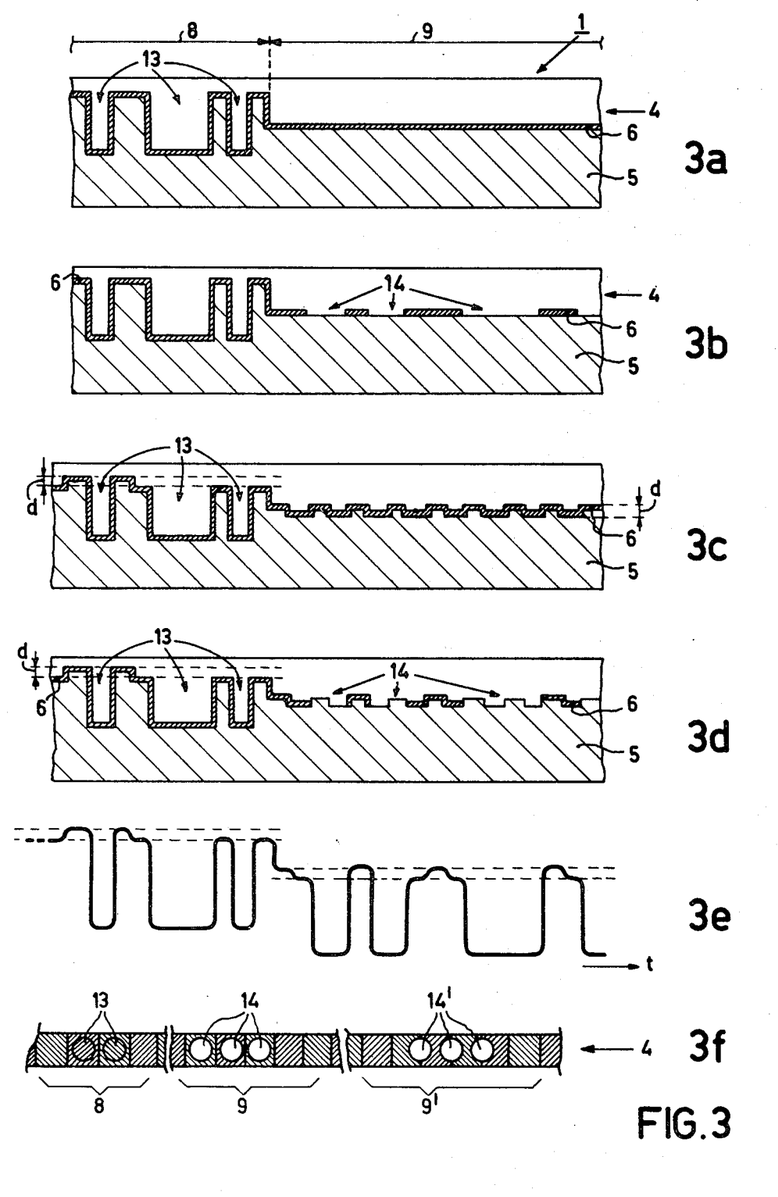
Figure 6A:
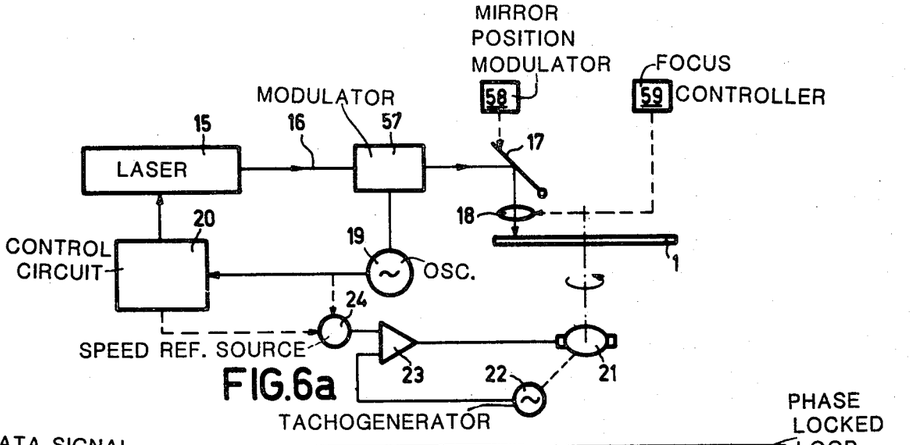
Figure 6B:
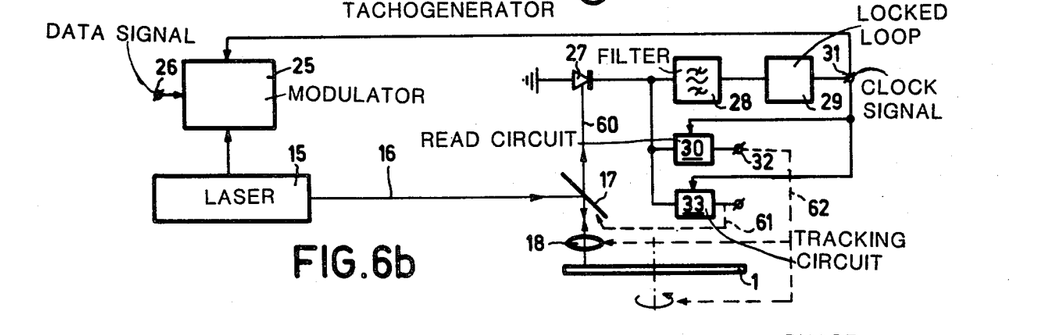
Figure 6C:
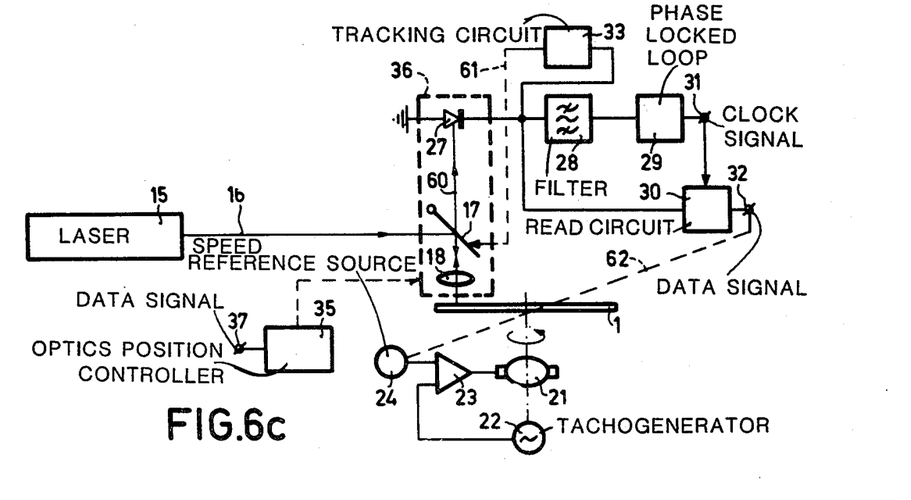

In order to illustrate how structures in accordance with FIG. 3 can be realized, FIG. 6, in this order, schematically shows in FIG. 6a an apparatus for manufacturing a record carrier in accordance with the invention, FIG. 6b an apparatus for recording information in the record carrier in accordance with the invention, and FIG. 6c an apparatus for reading such an inscribed record carrier.

In the apparatus of FIG. 6a the beam 16 from a laser 15 is projected onto a rotating disc 1 via for example an intensity modulator 57, a mirror 17 and a focusing optic 18, in order to locally from the spiral groove 4 (FIG. 1). The laser 15 is controlled by a circuit 20 for pulsating the laser 15 so as to form the pits 13 (FIG. 3) in the synchronization area 8. The modulator 57 is controlled by a source 19 having a frequency fo (or 2 fo) in order to realize a clock modulation structure in the groove 4. Alternatively, it is possible to modulate the laser 15 itself. The disc 1 is driven by a motor 21 which for the purpose of speed control is provided with a servo control, which may for example comprise a tachogenerator 22, a speed-reference source 24, and a servo-amplifier 23. In order to ensure that the recording areas 8 are situated at the correct locations on the disc in the track 4 and, as the case may be, to obtain a correct tangential distribution of the modulation fo on the disc, the circuit 20 and, as the case may be, the source 19 of the frequency fo may be locked to the servo control.

In order to obtain the second periodic radial track modulation the angle of said mirror 17 relative to the beam 16 may be modulated with with the appropriate frequency by means of a device 58, so as to obtain a high-frequence modulation of the track 4. Furthermore the circuit 20 is controlled by the source 19 in order to guarantee a correct phase relationship of the synchronization pits 30 with the clock modulation structure. After this process the disc 1 may be provided with the radiation sensitive layer 6.

FIG. 6b schematically represents an apparatus for providing the prepared disc 6 with information and simultaneously reading the clock modulation structures. This apparatus comprises the rotating disc 1, and a laser 15 whose beam 16, via a semitransparent mirror 17 and a focusing optic 18, is projected onto the disc 1. A reflected beam 30 is detected by means of a cell 27, for example a photodiode, and converted into an electric signal. Band-pass filter 28 extracts the component of the frequency fo (or 2 fo) from the detected signal. That component is mainly produced by the clock modulation structure preformed in the track 4. As the case may be, this signal may also be applied to a phase-locked loop 29, which improves the filtration, which increases the constancy of the clock signal and, as the case may be, compensates for brief signal dropouts. The clock signal is then available on output 31. Data can be recorded by pulse modulation of the laser beam 16, directly by including a modulator in the beam or, as is shown in FIG. 6b, by modulating the laser 15 itself with a write modulator circuit 25, to which the information is applied via an input 26 and which is synchronized with the clock signal on output 31.

Via the light-sensitive element 27 and a read circuit 30, the information contained in the synchronization portions is recovered from the reflected beam 60, which information appears on an output 32. This read circuit 30 may also be synchronized with the clock signal on output 31. Said information may be used to synchronize the circuit 25 and to locate the correct position on the disc. This information is also used in a servo control, not shown in FIG. 6b, for radially positioning the optic 18 and the mirror 17, for inscribing the desired portion of the track 4 and for controlling the drive of the disc 1, which is symbolically represented by the dashed lines 62 in FIG. 6b.

Furthermore, the apparatus may be provided with a tracking circuit 33 which derives a tracking signal form the signal supplied by the detector 27 in order to keep the beam 16 on the track 4 by controlling the angle of the mirror 17 relative to the beam 16. This is described in more detail with reference to FIGS. 8 and 9.

FIG. 6c shows an apparatus for reading an inscribed disc 1, which apparatus in practice is generally combined with that of FIG. 6b. The apparatus again comprises a laser 15, whose beam 16 is projected onto the disc 1 via a mirror 17 and the optic 18. The reflected beam 60 is detected with a photodiode 27 and the resulting electric signal is passed through a band-pass filter 28 having a pass frequency fo and a phase-locked loop 29 tuned to the frequency fo, so that the clock signal of the frequency fo (or 2 fo) is available on output 31. The information recorded on the disc is decoded from the electric signal supplied by the photodiode 27 by means of the read circuit 30, so that on an output 32 thereof the data and the information contained in the synchronization areas 8 is available. This read circuit is synchronized by means of the clock signal on output 31. In addition a tracking signal may be derived from the beam detected by a photodiode 27 by means of a tracking circuit 33, in order to control the mirror 17 in such a way that the beam 16 exactly follows the track 4. The disc drive motor 21 may be included in a servo control, for example comprising a tachogenerator 22, a reference source 24, and a servo amplifier 23, in order to control the speed, which control may be locked to the read circuit 30. Furthermore, the apparatus also comprises a control mechanism 35 for moving the optic 18 together with the mirror 17 and the detector 27—the complete mechanism being designated 36 in FIG. 6c—in a radial direction. This makes it possible to read a specific part of the disc with the radial movement being, controlled by information applied to an input 37 of the control mechanism 35 and by the information produced by the synchronization areas and available on output 32 of the read circuit 30.

Figure 7:
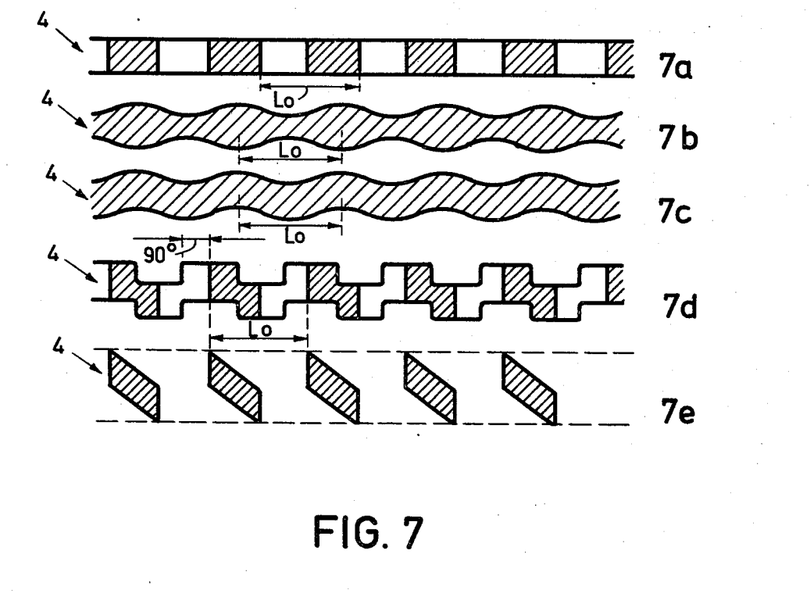

The clock information structure which is or has been recorded in track 4 may take various forms. FIG. 7 shows a number of examples thereof. FIG. 7a schematically represents a track 4, in which the clock information is formed by a height variation—symbolically represented by the interrupted hatching—for example by modulating the intensity of the laser beam that writes the track 4. FIG. 7b shows the track 4 in which the clock information is formed as a width variation of the track, for example by modulation of the laser-beam focusing, for which for example the objective 18 (FIG. 6a) may be controlled by means of the device 59. A combination of width and depth variations is also possible, which in practice will frequently be the case when the intensity or focusing of the laser beam is modulated. FIG. 7c shows the track 4 in which the clock information takes the form of a radial variation of the position of the track 4. This can, for example, be accomplished by modulating the angle of the mirror 17 (FIG. 6d) relative to the beam 16 by means of the device 58. All the clock variations shown then have a period length Lo which is equal to $L_o = V/f$, where V is the tangential speed of the disc 1 at said location and f the frequency of the desired clock signal. The frequency f corresponds to a zero point in the random frequency spectrum of the data to be recorded, for example the frequency fo (FIGS. 4c and 5c) in the case of "quadphase" modulation, and the radial variations have a period length $L_1$ which is of the same order of magnitude as the period length $L_0$.

A special combination, in accordance with the invention, of both periodic track modulation is obtained when the period $L_0$ or $L_1$ of the first and the second track variation respectively are equal and have a fixed phase relationship, which renders synchronous detection superfluous. FIG. 7d shows such a structure having a depth variation (represented by alternately hatched and non-hatched areas) in the track 4 combined with a radial positional variation which is 90° (this is a quarter of the period of said structure) shifted relative thereto. If the depth modulation structure is then selected so that the "shallow" parts of said variations coincide with the surface of the disc-shaped record carrier 1, the servo track 4 will take the form of a sequence of radially asymmetrical pits which are tangentially spaced from each other by distances eaqual to the distance Lo. FIG. 7e shows an example of such a track 4.

Figures 8A, 8B:
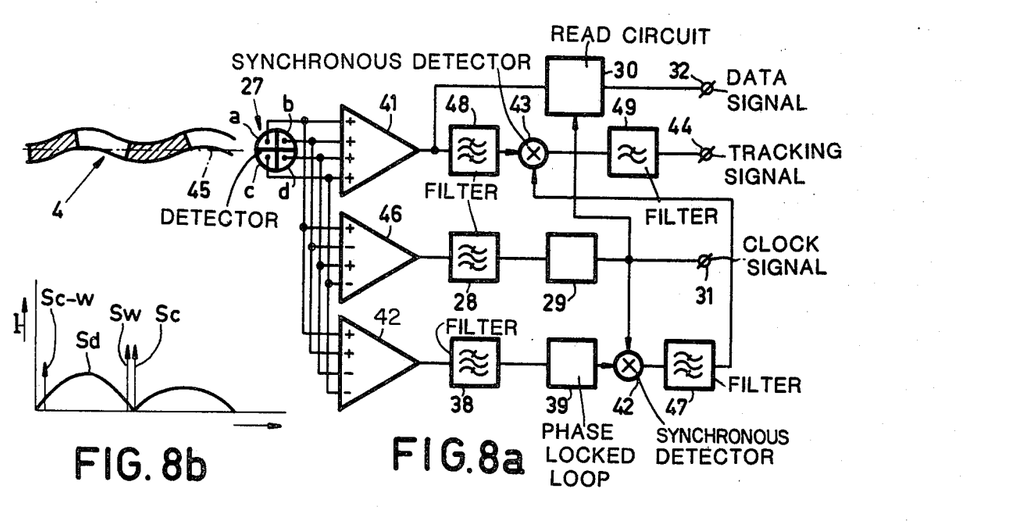

FIG. 8a shows the read section of an apparatus for reading and/or writing data in the information areas of a record carrier having a clock modulation structure and a wobble in order to obtain a radial tracking signal, the frequency of the wobble signal Sw being substantially equal to the frequency of the clock signal Sc. FIG. 8b shows the frequency spectrum in which Sd represents the data signal and Sc-w the term having a frequency equal to the difference between the frequencies of the clock signal Sc and the wobble signal Sw, which difference is for example 30 kHz. The term Sc-w is obtained in that the photodiode 27 receives the product of the first track modulation Sc and the second track modulation Sw. As a result of this, said term is situated in the low frequency part of the spectrum and is hardly affected by the data. The amplitude of this term constitutes the radial tracking signal. The amplitude is zero if the centre line 45 of the track is precisely followed. The wobble then further exhibits a term of double the difference frequency, which term is not used, and a term with the wobble frequency itself.

In the apparatus of FIG. 8a, the detector 27 is divided both along a tangential line and along a radial line, so that four quadrants, a, b, c and d are obtained. The sectors a and b and c and d, respectively, are situated on either side of the tangential line and the sectors a, c and b, d on either side of the radial line. An amplifier 41 or equivalent means determines the sum of the signals generated by the sectors a, b, c and d, so that said amplifier is in particular sensitive to intensity variations of the beam reflected by the track 4, i.e. to the data signal S1. An amplifier 42 determines the difference between the signals generated by the sectors a+b and c+d situated on either side of the tangential line, so that this amplifier 42 is particular sensitive to variations of the track 4 in in a tangential direction, i.e. to the first track modulation Sc. Lastly, an amplifier 46 determines the difference between signals generated by the sectors a+c and b+d situated on either side of the radial line, so that this amplifier is particularly sensitive to variations of the track 4 in the radial direction, i.e. to the second track modulation.

The clock signal Sc is derived from the output signal of amplifier 46 by means of the band-pass filter 28 and the phase-locked loop 29. The frequency of the wobble signal Sw is derived from tha output signal of amplifier 42 by means of a band-pass filter 38 and a phase-locked loop 39.

The two signals Sc and Sw are mixed with a synchronous detector 42 yielding the difference frequency which is filtered by the band-pass filter 47. From the output signal of amplifier 41 which supplies the sum of the signals produced by the sectors a, b, c, and d of photo-diode 27, the term of said difference frequency is extracted with the aid of a band-pass filter 48. By means of the synchronous detector 43, to which said different frequency obtained from the band-pass filter 47 is applied, this term is demodulated and, as the case may be, via a low-pass filter 49, the radial tracking signal is obtained on output 44.

Expressed mathematically, the apparatus of FIG. 8a operates as follows. Amplifier 41 contains a component $A_r \sin(W_c - W_b)t$, where $A_r$ is a signal representing the deviation of the detector 27 relative to the centre 45 of track 4, which is the desired tracking signal, $w_i$ is the angular frequency of the clock signal $S_c$, $w_b$ the angular frequency of the wobble signal Sw and t the time. Mixing the signals Sc and Sw obtained via filters 28 and 38, after filtering, yields a signal of the frequency $w_c - w_b$.

In the synchronous detector 43, after mixing with the signal $A_r \sin(w_c - w_d)t$ and filtering with low-pass filter 49, this signal yields the signal $A_r$. With the read circuit 30, synchronized with the clock signal Sc, the data signal can be recovered from the output signal of amplifier 41.

If the frequency of the wobble signal Sw is selected to equal the frequency of the clock signal, it will be evident from FIG. 8b that the term with the difference frequency directly constitutes the DC tracking signal. This tracking signal can then be obtained without synchronous detection.

The phase difference between the two track modulations should be unequal to zero, because only one modulation can be distinguished when the two modulations are in phase. It is found that 90° is an optimum phase difference.

Figure 9:
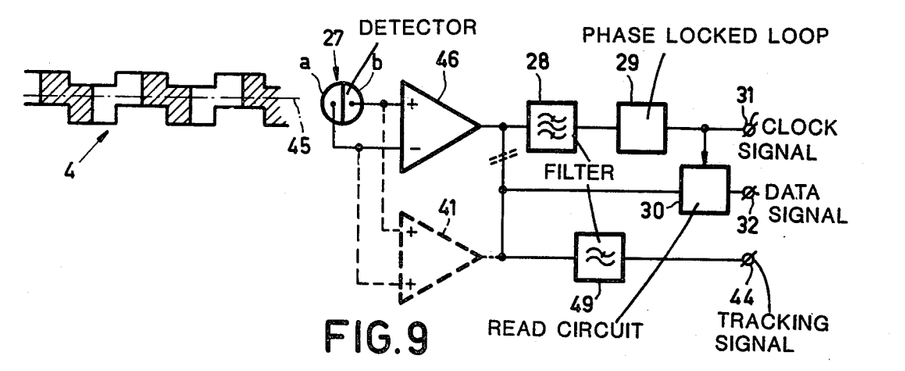
FIG. 9 shows a part of an apparatus for recording an information signal on a record carrier in accordance with the invention for the generation a clock signal during recording, use being made of an auxiliary laser beam.

FIGS. 7e and 7d shows such a structure, which can be read with the simple read circuit of FIG. 9.

In the apparatus of FIG. 9, the photodiode 27 is divided into two radial halves a and b for an optimum detection of the clock signal Sc. Signal sc is obtained on output 31 by determining the difference between the signals supplied by the two halves a and b with amplifier 46. The different signal is filtered with band-pass filter 28 and applied to the phase-locked loop 29. By filtering the output signal of amplifier 46 with a low-pass filter 49, the radial tracking signal is directly available on output 44. The data signal is recovered from the difference signal with read circuit 30, which is synchronized with the clock signal Sc. Alternatively, it is possible to recover the data signal and the low-frequency tracking signal with a summing amplifier 41. In respect of the tracking during the recording of data signals, the apparatus in accordance with FIGS. 8a and 9 may be extended with a device modulating a laser beam 16, which device is synchronized with the clock signal Sc and the signal read from the synchronization areas, as has been explained with reference to FIG. 6b.

In each of the foregoing embodiments it has been assumed that one detector 27 is used for detecting the reflected beam 16 (FIG. 6). Especially at high bit frequencies, it may be problematic, when recording data in the information areas 9 with a laser beam which is comparatively powerful relative to that used for reading, to recover the clock information from the beam which is reflected between every two write pulses.

Figure 10:
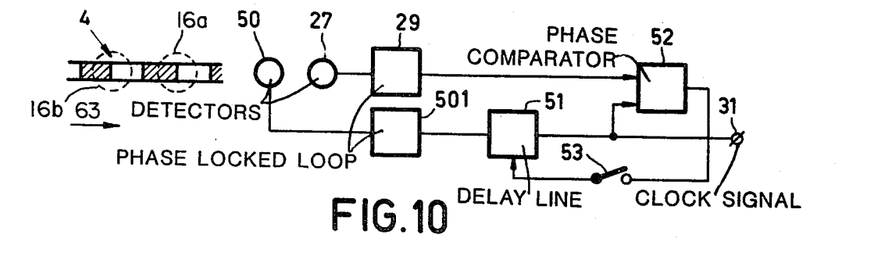
FIG. 10 shows a portion of an apparatus which uses a follower beam in addition to a recording beam for recording information on a record carrier in accordance with the invention.

Since in many cases a follower laser-beam is employed to read the data being recorded, the apparatus of FIG. 10 may be used with such arrangements. In this embodiment the track 4, which relative to the detector 27 travels in the direction of the arrow 63, is scanned by an information-writing beam 16a and a follower beam 16b represented by the dashed line spots in the figure. Said apparatus comprises a photodiode 27, which in respect of the reading of data signals and tracking signals fully corresponds to the apparatus in accordance with the FIGS. 8a and 9. Furthermore, the apparatus comprises a photodiode 50 for detecting the reflection of the follower beam 16b which is projected onto the track at some distance behind the beam 16a. During the read process and also when the synchronization areas 8 are being read, the clock signal Sc is obtained by applying the signal detected by photodiode 27 to the phase-locked loop 29 via an amplifier, which for simplicity is not shown in this Figure (for example 46 in FIG. 11a) and a band-pass filter (for example 28 in FIG. 11a). In addition, in particular during the writing process, said clock signal is also recovered in a similar way from the signal detected by photo-diode 50, as the case may be via a band-pass filter, not shown, and via a phase-locked loop 501, but this signal is delayed relative to the clock signal obtained via photodiode 27. Via a delay device 51 the output signal is applied to output 31. The phase of the delayed clock signal is then compared with the phase of the clock signal obtained by means of the photo-diode 27 in phase comparator 52 and via switch 53 the delay device 51 is adjusted so that the clock signal from photo-diode 50, which has been delayed by delay device 51, is in phase with the signal obtained via photodiode 27. During the read-out of the synchronization areas 8, switch 53 is closed and the delay device 51 is adjusted so that the clock signal from photo-diode 50, which has been delayed by said delay device 51, is in phase with the clock signal obtained via photo-diode 27.

During the recording of data in the information areas 9, switch 53 is open and the clock signal is recovered from the reflected auxiliary beam 16b via photo-diode 50 and is delayed with the delay device 51 by the time adjusted during the read-out of the synchronization areas 8. The switch 53 is operated on command of the synchronization signals read from the synchronization areas by the read circuit 30.

The invention is not limited to the embodiments shown, which relate to a data-storage medium with a subdivision into sectors. The invention may also be used in prepared record carriers for the storage of digitally coded audio, video or other information in more or less continuous information areas.

Furthermore the invention is not limited to record carriers in which the recorded information is detected via reflection of the laser beam, but may also be employed in record carriers where the recorded information is detected by detecting the radiation transmitted by the record carrier. Although the description with reference to the Figures is based on the use of laser beams, it is alternatively possible, in particular during reading, to employ focussed non-coherent light beams.

What is claimed is:

1. A record carrier for storing a digitally coded signal having a fixed bit frequency and a power spectrum with a substantially zero level at a predetermined frequency, said record carrier comprising a substrate provided with at least one information section for storing the digitally coded signal in a form detectable by a beam of radiation and at least one elongated servo track having a first periodic variation of a first period corresponding to said predetermined frequency and a configuration such that when scanned by a beam of radiation, the radiation is modulated by said first periodic variation to produce a first modulation component of a frequency corresponding to said first period for generating a clock signal for synchronizing read out or recording of the digitally coded signal, said servo track further having a second periodic variation in a direction transverse to the longitudinal direction of said servo track of a second period which is at least of the same order of magnitude as said first period, said second variation being configured to produce a second modulation component in the radiation of a frequency corresponding to said second period for generating a tracking signal for guiding a radiation beam used for readout or recording of the digitally coded signal.

2. The record carrier according to claim 1 wherein said predetermined frequency is equal to said bit frequency.

3. The record carrier according to claims 1 or 2 wherein said first and second periods are equal and said first and second variations have a fixed phase relationship to each other.

4. The record carrier according to claims 1 or 2 wherein said information section includes a radiation sensitive layer for recording the digitally coded signal thereon.

5. A record carrier for storing a digitally coded signal having a fixed bit frequency and a power spectrum with a substantially zero level at a predetermined frequency, which signal is recorded on and/or reproduced from the record carrier by a beam of radiation, said record carrier comprising a disc-shaped substrate provided with at least one generally circular track extending about the center of said substrate and having an information section for storing the digitally coded signal, at least a portion of said track having a first periodic variation of a first period corresponding to said predetermined frequency and a configuration such that when scanned by the beam, the radiation is modulated by said first periodic variation to produce a first modulation component of a frequency corresponding to said first period for generating a clock signal for synchronization of the recording or reproduction of the digitally coded signal on or from, respectively, said information section, said track portion further having a second periodic variation in a radial direction of a second period which is at least of the same order of magnitude as said first period, said second variation being configured to produce a second modulation component in the radiation of a frequency corresponding to said second period for generating a radial tracking signal for guiding the beam during recording or reproduction of the digitally coded signal.

6. A record carrier as claimed in claim 5 wherein the period for the first periodic track variation is equal to the period of the second periodic track variation and both track variations are in a fixed phase relationship with each other.

7. A record carrier as claimed in claim 6 wherein the first and the second periodic track variations are shifted a quarter of the period relative to each other.

8. A record carrier as claimed in claim 7, the first and the second periodic track variations are constituted by pits in the surface of the record carrier situated in the information sections at mutually equal distances and arranged in accordance with spiral or concentric lines, which pits have a geometry which substantially extends in a direction which locally makes an angle unequal to zero with both the tangential direction and the radial direction.

9. The record carrier according to claim 5 including a plurality of said circular tracks, said tracks defining turns of a spiral or concentric circles which are spaced from each other in the radial direction.

10. The record carrier according to claim 9 wherein each of said circular tracks has a plurality of said information sections which are spaced apart by and alternate in the track direction with regions having a plurality of spaced apart recesses defining digital information containing an address of an associated information section, said digital information being encoded in a form such that the power spectrum thereof has a substantially zero level at a frequency substantially equal to said frequency of said first modulation component produced by said first periodic variation when said track is scanned at a predetermined tangential speed by said beam.

11. The record carrier according to claim 5 wherein said information section is provided with a radiation sensitive layer for recording the digital signal therein by the beam of radiation.

12. The record carrier according to claims 5, 9 or 11 wherein said periods of said first and second track variation are such that when scanned by the beam at a predetermined tangential scanning speed, the difference between the frequencies of said first and second modulation components produced thereby is constant and low relative to the frequency of said first modulation component.

13. The record carrier according to claims 5, 9 or 11 wherein said predetermined frequency is substantially equal to said bit frequency.

14. The record carrier according to claims 9 or 11 wherein said first track variation is constituted by variations in the width of said track and said second track variation is constituted by periodic radial undulations of said track.

15. The record carrier according to claims 5, 9 or 11 wherein said first track variation is constituted by variations in the depth of said track.

16. The record carrier according to claims 5, 9 or 11 wherein said first track variations are constituted by recesses spaced uniformly from each other along said track.

17. An apparatus for forming an optically detectable track in an optical record carrier blank provided with a radiation sensitive layer for storing a digitally coded signal having a fixed bit frequency and a power spectrum with a substantially zero level at a predetermined frequency, said apparatus comprising means for producing a beam of radiation, means for focusing said beam to a spot on said layer, means for producing relative movement between said spot and said blank so that said spot inscribes an elongated track in said layer, first means for modulating said beam so as to produce a first, optically detectable, periodic variation in the track of a period corresponding to said predetermined frequency, and second means for modulating said beam so as to produce a second, optically detectable, periodic variation in the track in a direction transverse to the longitudinal direction of said track of a period at least of the same order of magnitude as the period of said first variation.

18. The apparatus according to claim 17 wherein said blank is disc-shaped and said producing means includes means for rotating said blank about the center thereof so that said spot inscribes a generally circular track which extends about the center of said blank.

19. The apparatus according to claims 17 or 18 wherein said first means includes means for periodically varying the focus of said beam so as to produce variations in the diameter of said spot at the surface of said blank.

20. The apparatus according to claims 17 or 18 wherein said first means includes means for periodically varying the intensity of said beam.

21. The apparatus according to claim 17 or 18 wherein said second modulating means includes means for periodically varying the position of said spot in said transverse direction relative to the center of the track being inscribed.

22. An apparatus for recording a digitally coded signal having a fixed bit frequency and a power spectrum with a substantially zero level at a predetermined frequency on a record carrier provided with a radiation sensitive layer and at least one elongated track, said track having a first periodic variation of a period corresponding to said predetermined frequency and a second periodic variation in a direction transverse to the longitudinal direction thereof with a period of at least the same order of magnitude as the period of said first variation, said apparatus comprising means for producing a beam of radiation, means for focusing said beam to a spot on said record carrier, means for producing relative movement between said record carrier and said spot so that said spot scans said track and is modulated by said periodic variations thereof, means for modulating a write beam of radiation in accordance with the digitally coded signal to be recorded on said radiation sensitive layer, means for detecting radiation which is modulated by said variations and is reflected or transmitted by the record carrier, said detecting means producing an electrical signal representative of the modulation of the detected radiation, first means for deriving from said electrical signal a first signal of a first frequency corresponding to the period of said first track variation at a predetermined scanning speed so as to obtain a clock signal which is applied to said modulating means for synchronizing the recording of said digital signal, second means for deriving from said electrical signal a second signal of a second frequency corresponding to the period of said second periodic variation at said predetermined speed, third means for deriving from said first and second signals a tracking signal indicative of the displacement of said spot from the center of said track, and means responsive to said tracking signal for maintaining said spot centered on said track.

23. The apparatus according to claim 22 wherein said record carrier is disc-shaped and is provided with a plurality of said tracks, and wherein said tracks are generally circular, extend about the center of said carrier and are spaced from each other in the radial direction.

24. The apparatus according to claim 23 wherein said first and second periodic variations are such that the difference between said first and second frequencies is substantially constant and comparatively low relative to said first frequency and wherein said third deriving means includes a first synchronous detector for mixing said first and second signals to obtain a third signal of a frequency equal to the difference between said first and second frequencies, a first band-pass filter coupled to said detecting means, said first filter being tuned to a frequency equal to the difference between said first and second frequencies for filtering said electrical signal, and a second synchronous detector for mixing the signal filtered by said first filter and said third signal to obtain said tracking signal.

25. The apparatus according to claim 24 wherein said detecting means includes a radiation sensitive detector which is divided into four sectors by a pair of orthogonal lines one of which corresponds to the radial direction on said blank and the other corresponds to the tangential direction on said blank, each of said sectors producing an electrical signal representative of the modulation of the radiation incident thereon, and including means for applying to said first deriving means a signal equal to the difference between the electrical signals produced by the sectors disposed on opposite sides of said one line corresponding to said radial direction, means for applying to said second deriving means a signal equal to the difference between the electrical signals produced by sectors disposed on opposite sides of said other line corresponding to said tangential direction, and means for applying to said first filter the sum of the four electrical signals produced by said four sectors.

26. The apparatus according to claims 24 or 25 wherein said first deriving means includes a band-pass filter tuned to said first frequency and said second deriving means includes a band-pass filter tuned to said second frequency.

27. An apparatus for recording a digitally coded signal having a fixed bit frequency and a power spectrum with a substantially zero level at a predetermined frequency on a record carrier provided with a radiation sensitive layer and at least one elongated track, said track having a first periodic variation of a period corresponding to said predetermined frequency and a second periodic variation in a direction transverse to the longitudinal direction thereof, with a period equal to the period of said first variation, said first and second variations having a fixed phase relationship with each other, said apparatus comprising means for producing a beam of radiation, means for focusing said beam to a spot on said record carrier, means for producing relative movement between said record carrier and said spot so that said spot scans said track and is modulated by said periodic variations thereof, means for modulating a write beam of radiation in accordance with the digitally coded signal to be recorded on said radiation sensitive layer, means for detecting radiation which is modulated by said variations and is reflected or transmitted by the record carrier, said detecting means producing an electrical signal representative of the modulation of the detected radiation, means for deriving from said electrical signal a first signal of a first frequency corresponding to the period of said first track variations at a predetermined scanning speed so as to obtain a clock signal which is applied to said modulating means for synchronizing the recording of said digital signal, and a low pass filter for filtering said electrical signal in order to obtain a tracking signal indicative of the displacement of said spot from the center of said track, and means responsive to said tracking signal for maintaining said spot centered on said track.

28. The apparatus according to claim 27 wherein said record carrier is disc-shaped and is provided with a plurality of said tracks, and wherein said tracks are generally circular, extend about the center of said carrier and are spaced from each other in the radial direction.

29. The apparatus according to claim 28 wherein said deriving means includes a band-pass filter tuned to said first frequency.

30. The apparatus according to claims 28 or 29 wherein said detecting means includes a radiation sensitive detector which is divided into two halves by a line which corresponds to the radial direction on said blank, each of said halves producing an electrical signal representative of the modulation of the radiation incident thereon, and including means for applying to said deriving means a signal equal to the difference between the electrical signals produced by said two halves.

31. An apparatus for reading a record carrier containing digitally coded information recorded thereon in a first, elongated track portion, said digitally coded information having a fixed bit frequency and a power spectrum with a substantially zero level at a predetermined frequency, said record carrier having at least one elongated servo track portion which is generally parallel to said first track portion, said servo track portion having a first periodic variation of a period corresponding to said predetermined frequency and a second periodic variation in a direction transverse to the longitudinal direction thereof with a period of at least the same order of magnitude as the period of said first variation, said apparatus comprising means for producing a beam of radiation, means for focusing said beam to a spot on said record carrier, means for producing relative movement between said record carrier and said spot so that said spot scans said first and said servo track portions and is modulated thereby, means for detecting modulated radiation coming from the record carrier, said detecting means producing an electrical signal representative of the modulation of the detected radiation, first means for deriving, from said electrical signal, a first signal representative of the recorded, digitally coded information, second means for deriving from said electrical signal a second signal of a first frequency corresponding to the period of said first track variation at a predetermined scanning speed so as to obtain a clock signal which is applied to said first deriving means for synchronizing the read out of said digitally coded information, third means for deriving, from said electrical signal, a third signal of a second frequency corresponding to the period of said second periodic variation at said predetermined speed, fourth means for deriving from said second and third signals a tracking signal indicative of the displacement of said spot from the center of the track portion being scanned, and means responsive to said tracking signal for maintaining said spot centered on the track portion being scanned.

32. The record carrier according to claim 31 wherein said record carrier is disc-shaped and including a plurality of generally circular tracks which extend about the center of said carrier and are spaced apart in the radial direction, said circular tracks being comprised of said first and servo track portions.

33. The apparatus according to claims 31 or 32 wherein said first and second periodic variations are such that the difference between said first and second frequencies is substantially constant and comparatively low relative to said first frequency and wherein said fourth deriving means includes a first synchronous detector for mixing said second and third signals to obtain a fourth signal of a frequency equal to the difference between said first and second frequencies, a first band-pass filter coupled to said detecting means, said first filter being tuned to a frequency equal to the difference between said first and second frequencies for filtering said electrical signal, and a second synchronous detector for mixing the signal filtered by said first filter and said fourth signal to obtain said tracking signal.

34. The apparatus according to claim 33 wherein said detecting means includes a radiation sensitive detector which is divided into four sectors by a pair of orthogonal lines one of which corresponds to the longitudinal direction of said servo track portion, each of said sectors producing an electrical signal representative of the modulation of the radiation incident thereon, and including means for applying to said second deriving means a signal equal to the difference between the electrical signals produced by the sectors disposed on opposite sides of the other of said lines, means for applying to said third deriving means a signal equal to the difference between the electrical signals produced by sectors disposed on opposite sides of said one line, and means for applying to said first filter the sum of the four electrical signals produced by said four sectors.

35. The apparatus according to claim 33 wherein said second deriving means includes a band-pass filter tuned to said first frequency and said third deriving means includes a band-pass filter tuned to said second frequency.

36. An apparatus for reading a record carrier containing digitally coded information recorded thereon in a first, elongated track portion, said digitally coded information having a fixed bit frequency and a power spectrum with a substantially zero level at a predetermined frequency, said record carrier having at least one elongated servo track portion which is generally parallel to said first track portion, said servo track portion having a first periodic variation of a period corresponding to said predetermined frequency and a second periodic variation in a direction transverse to the longitudinal direction thereof with a period equal to the period of said first variation, said first and second variations having a fixed phase relationship with each other, said apparatus comprising means for producing a beam of radiation, means for focusing said beam to a spot on said record carrier, means for producing relative movement between said record carrier and said spot so that said spot scans said first and said servo track portions and is modulated thereby, means for detecting modulated radiation coming from the record carrier, said detecting means producing an electrical signal representative of the modulation of the detected radiation, first means for deriving from said electrical signal a first signal representative of the recorded, digitally coded information, second means for deriving from said electrical signal a second signal of a first frequency corresponding to the period of said first track variations at a predetermined scanning speed so as to obtain a clock signal which is applied to said first deriving means for synchronizing the read out of said digitally coded information, and a low pass filter for filtering said electrical signal in order to obtain a tracking signal indicative of the displacement of said spot from the center of the track portion being scanned, and means responsive to said tracking signal for maintaining said spot centered on the track portion being scanned.

37. The apparatus according to claim 36 wherein said second deriving means includes a band-pass filter tuned to said first frequency.

38. The apparatus according to claims 36 or 37 wherein said detecting means includes a radiation-sensitive detector which is divided into two halves by a line which corresponds to a direction transverse to the longitudinal direction of said servo track portion, each of said halves producing an electrical signal representative of the modulation of the radiation incident thereon, and including means for applying to said second deriving means a signal equal to the difference between the electrical signals produced by said two halves.

* * * * *